P. BELLARD.
APPARATUS FOR ASSEMBLING BALL BEARINGS.
APPLICATION FILED MAR. 6, 1917.
1,259,346.
Patented Mar. 12, 1918.
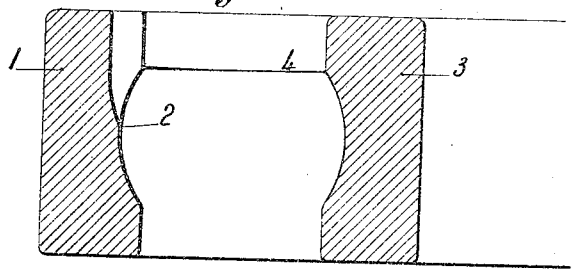
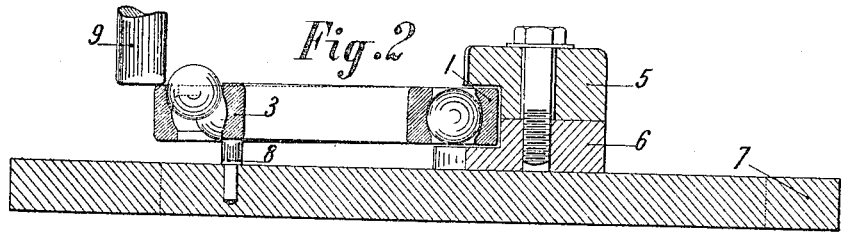
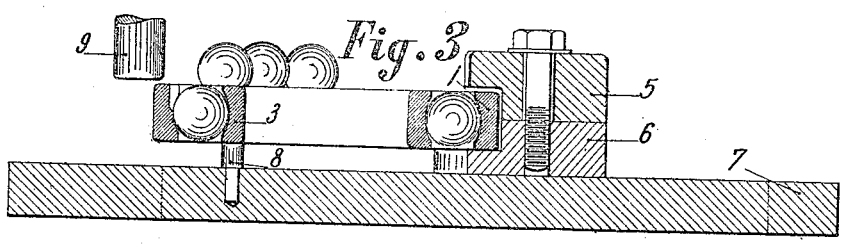

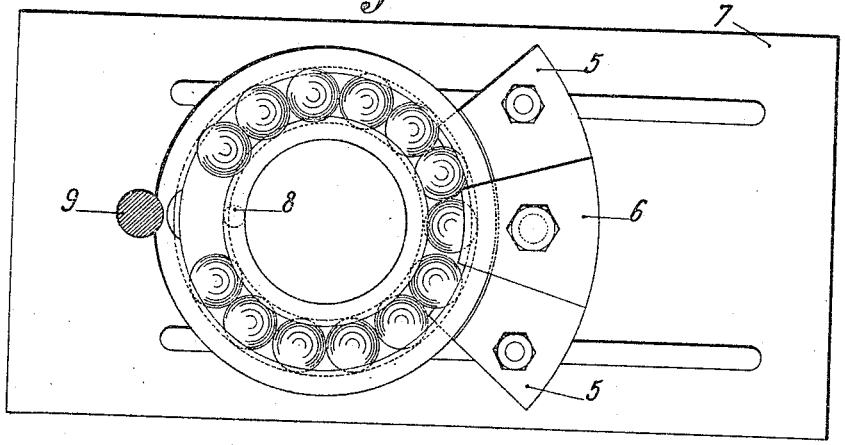
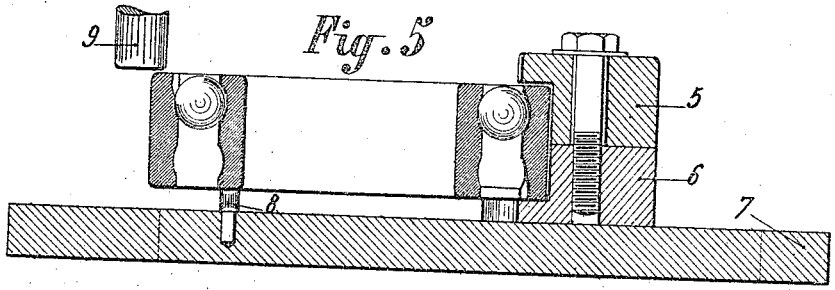

UNITED STATES PATENT OFFICE.

PAUL BELLARD, OF PARIS, FRANCE.

APPARATUS FOR ASSEMBLING BALL-BEARINGS.

1,259,346.  Specification of Letters Patent.  Patented Mar. 12, 1918.

Application filed March 6, 1917. Serial No. 152,911.

*To all whom it may concern:*

Be it known that I, PAUL BELLARD, engineer, of 7 Rue du Colonel Moll, at Paris, Department of the Seine, France, citizen of the French Republic, have invented certain new and useful Improvements in or Relating to Apparatus for Assembling Ball-Bearings; and I do hereby declare the following to be a full, clear, and exact description of the invention, such as will enable others skilled in the art to which it appertains to make and use the same.

In annular ball bearings provided with one or two sets of balls, and having deep running grooves and a large number of balls (either bearing filled with balls or provided with cages), the ball races are generally provided with lateral passage-ways or notches, and the latter do not go right to the bottom of the grooves, in order to insure the balls having continuous running tracks. It is true that certain manufacturers have employed a single notch, but, as it was then necessary to avoid increasing the depth of the single notch, to a dangerous extent they were compelled to provide only shallow running grooves, to avoid having to introduce the balls by force.

The subject of the present invention includes an apparatus for introducing balls into a bearing having one or two sets of balls, the balls admitting of being separated or not by cages, there being provided for each set of balls a single notch, made in one of the two races, and not extending right to the bottom of the corresponding running groove, which notch suffices for putting the balls into their place.

The method of assembling consists of holding the outer ball race, on the side opposite to the notch, in a vise, and of supporting the inner race on a suitable support. By bending the outer race by pressure, while the inner race remains relatively fixed, the passage between the notch and the unnotched race is enlarged, and the balls can be introduced in succession and can fall freely. In order to increase the deformation of the outer race it can be previously heated, and if necessary the inner race can be cooled.

The annexed drawing represents, by way of example, an arrangement that would enable the method forming the subject of the invention to be applied.

Figure 1 is a section through the plane of symmetry of the notch, passing through the axis of the bearing.

Fig. 2 is a section through the same plane, showing the position of the point of application of the pressure, just at the moment when the ball is being introduced.

Fig. 3 is a similar section, the press having gone up again, and the ball having been introduced.

Fig. 4 is a view from above of the whole arrangement.

Fig. 5 shows the application of the method to a bearing provided with two sets of annular grooves.

The notch shown in Fig. 1 can be formed by means of a milling-cutter consisting of a cylinder attached to a hemisphere, having a diameter slightly greater than that of the balls provided in the bearing.

In this way the outer race 1 exhibits a projection 2, which can be arranged at a given point, by milling more or less deeply. If the race 1 is displaced about a center, the point 2 describes a trajectory, and if the inner race 3 of the bearing remains fixed, the distance 2—4 between the projection 2 and the point of inter-section 4 of the running groove and the inner cylindrical face of the race 3, is increased. In this way the supplementary balls can be freely introduced under the action of their own weight between the tracks for the balls. In practice the method is carried out as follows:—

The outer race 1 is heated to a temperature of about 120°, while the inner race remains at the ordinary temperature, or can be cooled.

A sufficient number of balls to center the two ball races with relation to one another are then introduced between the two races, into the opposite grooves, by hand in the usual way.

The outer race 1 is then held, at the side opposite to the notch, in a vise with fixed jaws 5 and 6, mounted on a steel plate 7, a pin 8 serving to support the inner race.

The bearing is placed in such a way that it rests, by its outer race on the lower jaw of the vise, and by its inner race on the pin. 9 is the plunger of a press which can bring pressure to bear on the outer race. The axes of the bearing, the vise, the pin and the plunger of the press are, as far as possible, in the same vertical plane.

Under these conditions, having previously brought the balls already inserted toward the part opposite to the notch, in such a manner as to free the latter for the introduction of an additional ball, the latter is arranged in such a way that it rests on the entrance to the notch and on the inner race as shown in Fig. 2. The press is then brought into operation, until the ball has fallen freely under the action of gravity into position between the two grooves of the ball races.

This ball having entered, the plunger of the press is raised, the ball introduced is moved away so as to free the notch (this is easily done by rotating the inner race) and the bearing is ready to receive a fresh ball in the same manner. The same process is repeated until the filling is finished.

In the case of a bearing with two sets of balls (see Fig. 5), the method is analogous for each of the sets a single notch being made on one of the two races. The two notches can for example be provided for on the outer race, and the balls of each of the rows can be put in place successively.

I claim:

1. Apparatus for operating on inner and outer ball races to permit the insertion of ball bearings therebetween which consists of means for supporting the outer ball race at one side thereof, means for supporting the inner ball race, and means for depressing the outer ball race at a point opposite to that at which it is supported.

2. Apparatus for operating on inner and outer ball races to permit the insertion of ball bearings therebetween, which consists of means for supporting the outer race at one side thereof, means for supporting the inner race, but permitting its rotation in the plane of the inner race and means for depressing the outer race at a point opposite to that at which the outer race is supported.

3. Apparatus for operating on inner and outer ball races to permit the insertion of ball bearings therebetween, which consists of a clamp for supporting the outer race at one side thereof, a pin for supporting the inner race at the opposite side thereof, and means for depressing the outer race at a point opposite to that at which it is supported.

4. Apparatus for operating on inner and outer ball races, including means for supporting the races in substantially the same plane and means for distorting the outer race by applying pressure to one edge thereof.

5. Apparatus for operating on inner and outer ball races to permit the insertion of ball bearings therebetween, which races have cylindrical opposing faces with annular grooves therein, which consists of means for supporting the inner and outer races in substantially the same plane, and means for distorting the outer race to increase the distance between the edge formed by the groove in the outer race and the corresponding edge formed by the groove in the inner race.

6. Apparatus for operating on inner and outer ball races to permit the insertion of ball bearings therebetween, consisting of means for supporting the outer race at one side thereof, means for supporting the inner race in substantially the plane of the outer race, and means for depressing the outer race at a point opposite to the point of support of the outer race, the supporting means for the inner race being located in a line drawn between the supporting means and depressing means for the outer race.

In testimony whereof I affix my signature, in presence of two witnesses.

PAUL BELLARD.

Witnesses:
CHAS. P. PRESSLY,
HENRI COHEN.